United States Patent
Roblek et al.

(10) Patent No.: US 9,542,948 B2
(45) Date of Patent: Jan. 10, 2017

(54) TEXT-DEPENDENT SPEAKER IDENTIFICATION

(71) Applicant: Google Inc., Mountain View, CA (US)

(72) Inventors: Dominik Roblek, Mountain View, CA (US); Matthew Sharifi, Palo Alto, CA (US); Raziel Alvarez Guevara, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 29 days.

(21) Appl. No.: 14/612,830

(22) Filed: Feb. 3, 2015

(65) Prior Publication Data

US 2015/0294670 A1    Oct. 15, 2015

Related U.S. Application Data

(60) Provisional application No. 61/977,278, filed on Apr. 9, 2014.

(51) Int. Cl.
  *G10L 15/00* (2013.01)
  *G10L 17/18* (2013.01)
  *G10L 17/00* (2013.01)

(52) U.S. Cl.
  CPC ............ *G10L 17/18* (2013.01); *G10L 17/005* (2013.01)

(58) Field of Classification Search
  USPC .................................................. 704/246–250
  See application file for complete search history.

(56) References Cited

U.S. PATENT DOCUMENTS

| | | | |
|---|---|---|---|
| 5,461,697 A | 10/1995 | Nishimura et al. | |
| 6,141,644 A | 10/2000 | Kuhn | |
| 6,205,424 B1 | 3/2001 | Goldenthal | |
| 2002/0194003 A1* | 12/2002 | Mozer | G06F 21/32 704/270.1 |
| 2005/0228673 A1* | 10/2005 | Nefian | G10L 15/25 704/270 |
| 2007/0198257 A1 | 8/2007 | Zhang | |

OTHER PUBLICATIONS

Chen et al., "Learning Speaker-Specific Characteristics With a Deep Neural Architecture," IEEE Transactions on Neural Networks, Service Center, vol. 22, No. 11, Nov. 2011, pp. 1744-1756.

(Continued)

*Primary Examiner* — Jesse Pullias
(74) *Attorney, Agent, or Firm* — Fish & Richardson P.C.

(57) ABSTRACT

Methods, systems, and apparatus, including computer programs encoded on a computer storage medium, for speaker verification. The methods, systems, and apparatus include actions of inputting speech data that corresponds to a particular utterance to a first neural network and determining an evaluation vector based on output at a hidden layer of the first neural network. Additional actions include obtaining a reference vector that corresponds to a past utterance of a particular speaker. Further actions include inputting the evaluation vector and the reference vector to a second neural network that is trained on a set of labeled pairs of feature vectors to identify whether speakers associated with the labeled pairs of feature vectors are the same speaker. More actions include determining, based on an output of the second neural network, whether the particular utterance was likely spoken by the particular speaker.

20 Claims, 10 Drawing Sheets

(56) References Cited

OTHER PUBLICATIONS

Salman et al., "Exploring speaker-specific characteristics with deep learning," Proceedings of international Joint Conference on Neural Networks, San Jose, California, USA, Jul. 31-Aug. 5, 2011, pp. 103-110.

International Search Report and Written Opinion in International Application No. PCT/US2015/023594, mailed Jul. 10, 2015, 11 pages.

* cited by examiner

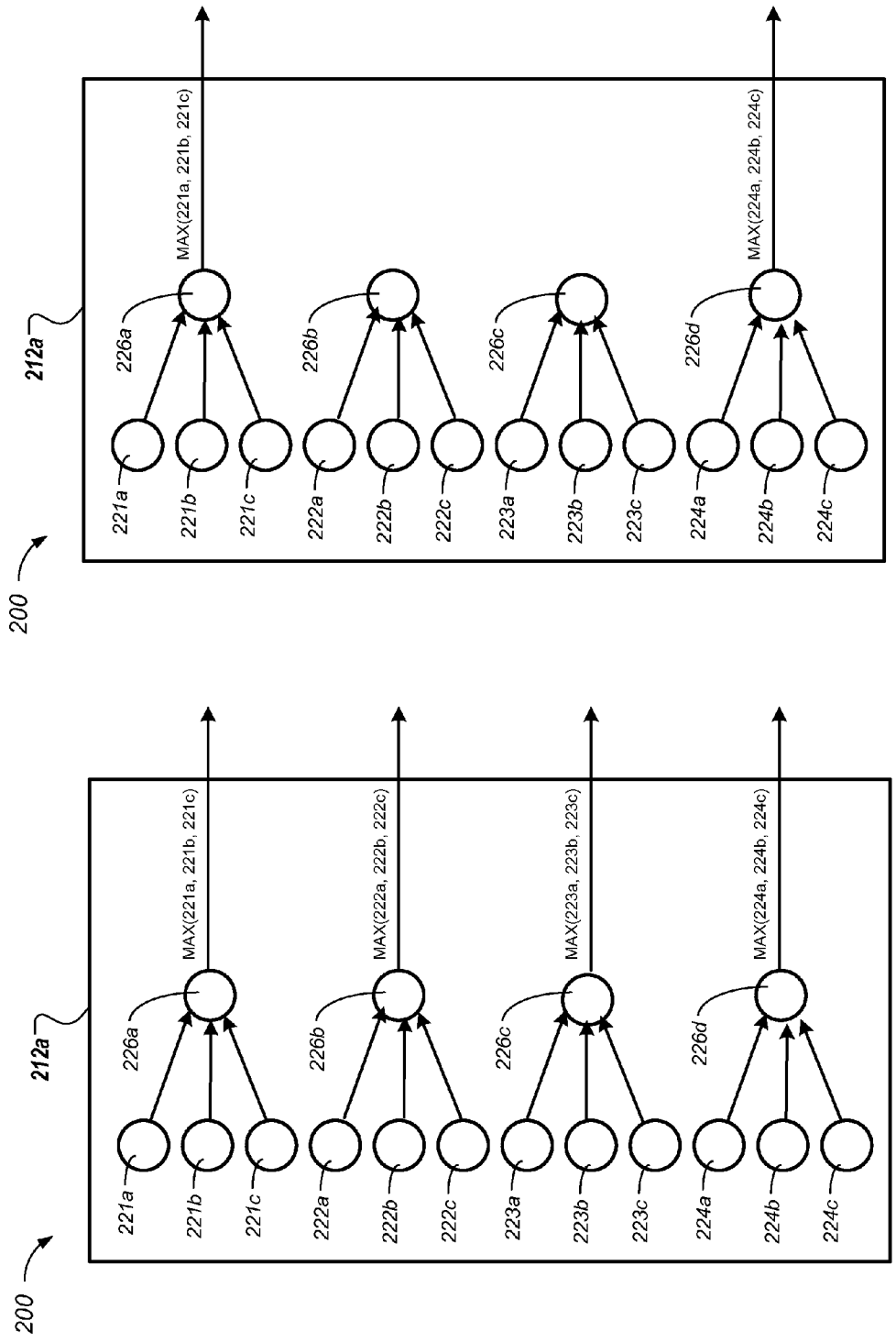

TEXT-DEPENDENT SPEAKER IDENTIFICATION

CROSS REFERENCE TO RELATED APPLICATION

This application claims the benefit of U.S. Provisional Application Ser. No. 61/977,278, filed on Apr. 9, 2014, which is incorporated by reference.

TECHNICAL FIELD

This specification generally relates to speaker verification.

BACKGROUND

In some instances, it may be useful to verify a user's identify based on the user's voice. A user's identity may be verified by voice based on determining that characteristics of a user's voice from a particular utterance match previously stored characteristics of the user's voice.

SUMMARY

According to one innovative aspect of the subject matter described in this specification, speaker verification may be performed using an evaluation vector similarity model. The evaluation vector similarity model may receive an evaluation vector representing characteristics of a speaker's voice from a particular utterance and a reference vector representing characteristics of a particular speaker's voice. The evaluation vector similarity model may then determine whether it is likely that the particular utterance was spoken by the particular speaker.

The evaluation vector similarity model may be a neural network that is trained using labeled pairs of feature vectors representing characteristics of speakers' voices from utterances. The pairs of feature vectors may be labeled as either representing feature vectors for the same speaker or for different speakers.

In some aspects, the subject matter described in this specification may be embodied in methods that may include the actions of inputting speech data that corresponds to a particular utterance to a first neural network and determining an evaluation vector based on output at a hidden layer of the first neural network. Additional actions include obtaining a reference vector that corresponds to a past utterance of a particular speaker. Further actions include inputting the evaluation vector and the reference vector to a second neural network that is trained on a set of labeled pairs of feature vectors to identify whether speakers associated with the labeled pairs of feature vectors are the same speaker. More actions include determining, based on an output of the second neural network, whether the particular utterance was likely spoken by the particular speaker.

Other versions include corresponding systems, apparatus, and computer programs, configured to perform the actions of the methods, encoded on computer storage devices.

These and other embodiments may each optionally include one or more of the following features. For instance, in some implementations speakers associated with one or more of the labeled pairs of feature vectors are different speakers. In some aspects, a speaker associated with one or more of the labeled pairs of feature vectors is the particular speaker. In certain aspects, actions include inputting the set of labeled pairs of feature vectors to a neural network trainer and obtaining the second neural network based on an output of the neural network trainer.

In some implementations, each of the labeled pairs of the set of labeled pairs of feature vectors comprises a first feature vector, a second feature vector, and a label indicating whether the second neural network is to output that utterances corresponding to the first feature vector and the second feature vector were likely spoken by a same speaker. In some aspects, actions include generating the set of labeled pairs of feature vectors.

In certain aspects, generating the set of labeled pairs of feature vectors includes inputting speech data that corresponds to a first utterance spoken by the particular speaker to the first neural network, in response to inputting the speech data that corresponds to the first utterance spoken by the particular speaker to the first neural network, determining a first feature vector based on output at the hidden layer of the first neural network, inputting speech data that corresponds to a second utterance spoken by the particular speaker to the first neural network, in response to inputting the speech data that corresponds to the second utterance spoken by the particular speaker to the first neural network, determining a second feature vector based on output at the hidden layer of the first neural network, and labeling the first feature vector and the second feature vector with an indication that the second neural network is to output that the utterances corresponding to the first feature vector and the second feature vector were likely spoken by the same speaker.

In some implementations, generating the set of labeled pairs of feature vectors includes determining that a first feature vector and a second feature vector correspond to utterances that are not spoken by the same speaker, in response to determining that the first feature vector and the second feature vector correspond to utterances that are not spoken by the same speaker, generating a third feature vector based on adding a predetermined amount of random noise to the first feature vector, and labeling the first feature vector and the third feature vector with an indication that the second neural network is to output that the utterances corresponding to the first feature vector and the third feature vector were likely spoken by the same speaker.

In certain aspects, the particular utterance corresponds to a hotword. In some aspects, determining, based on the output of the second neural network, whether the particular utterance was likely spoken by the particular speaker includes determining a cosine distance between the evaluation vector and the reference vector, and determining, based on an output of the second neural network and the determined cosine distance, whether the particular utterance was likely spoken by the particular speaker.

The details of one or more implementations are set forth in the accompanying drawings and the description below. Other potential features and advantages will become apparent from the description, the drawings, and the claims.

BRIEF DESCRIPTION OF THE DRAWINGS

FIG. 2B is a block diagram of an example neural network layer that implements a maxout feature.

FIG. 2C is a block diagram of an example neural network layer that implements a dropout feature.

Like reference numbers and designations in the various drawings indicate like elements.

DETAILED DESCRIPTION

Figure 1:
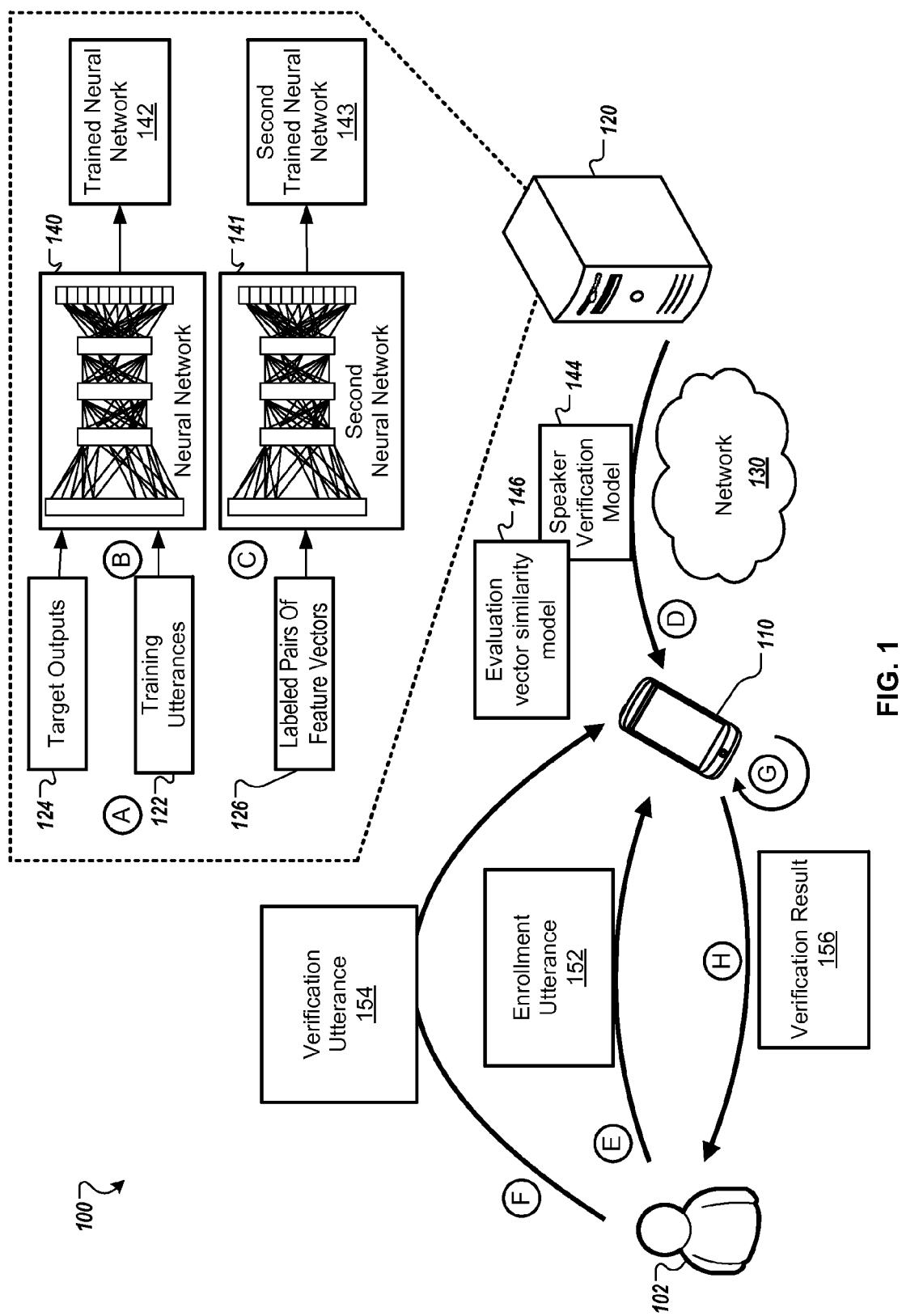
FIG. 1 is a block diagram of an example system that can verify a user's identity using a speaker verification model and an evaluation vector similarity model.

FIG. 1 is a block diagram of an example system 100 that can verify a user's identity using a speaker verification model based on a neural network. Briefly, a speaker verification process is the task of accepting or rejecting the identity claim of a speaker based on the information from his/her speech signal. In general, the speaker verification process includes three phases, (i) training of the speaker verification model and an evaluation vector similarity model, (ii) enrollment of a new speaker, and (iii) verification of the enrolled speaker.

The system 100 includes a client device 110, a computing system 120, and a network 130. In some implementations, the computing system 120 may provide a speaker verification model 144 based on a trained neural network 142 to the client device 110 and an evaluation vector similarity model 146. The client device 110 may use the speaker verification model 144 to enroll the user 102 to the speaker verification process. When the identity of the user 102 needs to be verified at a later time, the client device 110 may receive speech utterance of the user 102 to verify the identity of the user 102 using the speaker verification model 144 and the evaluation vector similarity model 146.

Although not shown in FIG. 1, in some other implementations, the computing system 120 may store the speaker verification model 144 based on the trained neural network 142 and the evaluation vector similarity model 146. The client device 110 may communicate with the computing system 120 through the network 130 to use the speaker verification model 144 to enroll the user 102 to the speaker verification process. When the identity of the user 102 needs to be verified at a later time, the client device 110 may receive speech utterance of the user 102, and communicate with the computing system 120 through the network 130 to verify the identity of the user 102 using the speaker verification model 144 and the evaluation vector similarity model 146.

In the system 100, the client device 110 can be, for example, a desktop computer, laptop computer, a tablet computer, a wearable computer, a cellular phone, a smart phone, a music player, an e-book reader, a navigation system, or any other appropriate computing device. The functions performed by the computing system 120 can be performed by individual computer systems or can be distributed across multiple computer systems. The network 130 can be wired or wireless or a combination of both and can include the Internet.

In some implementations, a client device 110, such as a phone of a user, may store a speaker verification model 144 and an evaluation vector similarity model 146 locally on the client device 110, allowing the client device 110 to verify a user's identity without reaching out to a remote server (e.g., the computing system 120) for either the enrollment or the verification process, and therefore may save communications bandwidth and time. Moreover, in some implementations, when enrolling one or more new users, the speaker verification model 144 and the evaluation vector similarity model 146 described here do not require any retraining of the speaker verification model 144 and the evaluation vector similarity model 146 using the new users, which also is computationally efficient.

It is desirable that the size of the speaker verification model 144 be compact because the memory space on the client device 110 may be limited. As described below, the speaker verification model 144 is based on a trained neural network. The neural network may be trained using a large set of training data, and may generate a large amount of data at the output layer. However, the speaker verification model 144 may be constructed by selecting only certain layers of the neural network, which may result in a compact speaker verification model suitable for the client device 110.

FIG. 1 also illustrates an example flow of data, shown in stages (A) to (H). Stages (A) to (H) may occur in the illustrated sequence, or they may occur in a sequence that is different than in the illustrated sequence. In some implementations, one or more of the stages (A) to (H) may occur offline, where the computing system 120 may perform computations when the client device 110 is not connected to the network 130.

During stage (A), the computing system 120 obtains a set of training utterances 122, and inputs the set of training utterances 122 to a supervised neural network 140. In some implementations, the training utterances 122 may be one or more predetermined words spoken by the training speakers that were recorded and accessible by the computing system 120. Each training speaker may speak a predetermined utterance to a computing device, and the computing device may record an audio signal that includes the utterance. For example, each training speaker may be prompted to speak the training phrase "Hello Phone." In some implementations, each training speaker may be prompted to speak the same training phrase multiple times. The recorded audio signal of each training speaker may be transmitted to the computing system 120, and the computing system 120 may collect the recorded audio signals and select the set of training utterances 122. In other implementations, the various training utterances 122 may include utterances of different words.

During stage (B), the computing system 120 uses the training utterances 122 to train a neural network 140, resulting in a trained neural network 142. In some implementations, the neural network 140 is a supervised deep neural network.

During training, information about the training utterances 122 is provided as input to the neural network 140. Training targets 124, for example, different target vectors, are specified as the desired outputs that the neural network 140 should produce after training. For example, the utterances of each particular speaker may correspond to a particular target output vector. One or more parameters of the neural network 140 are adjusted during training to form a trained neural network 142.

For example, the neural network 140 may include an input layer for inputting information about the training utterances 122, several hidden layers for processing the training utterances 122, and an output layer for providing output. The weights or other parameters of one or more hidden layers may be adjusted so that the trained neural network produces the desired target vector corresponding to each training utterance 122. In some implementations, the desired set of target vectors may be a set of feature vectors, where each feature vector is orthogonal to other feature vectors in the set. For example, speech data for each different speaker from the set of training speakers may produce a distinct output vector at the output layer using the trained neural network.

The neural network that generates the desired set of speaker features may be designated as the trained neural network 142. In some implementations, the parameters of the supervised neural network 140 may be adjusted automatically by the computing system 120. In some other implementations, the parameters of the supervised neural network 140 may be adjusted manually by an operator of the computing system 120. The training phase of a neural network is described in more details below in descriptions of FIGS. 2A, 2B, 2C, and 3.

During stage (C), the computing system 120 obtains labeled pairs of feature vectors 126, and inputs the labeled pairs of feature vectors 126 to a second supervised neural network 141. The labeled pairs of feature vectors may represent characteristics of voices of multiple different speakers. In some implementations, the labeled pairs of feature vectors 126 may be outputs from inputting speech data corresponding to utterances from multiple different speakers to the speaker verification model 144.

Each labeled pair of feature vectors 126 may include a first feature vector corresponding to characteristics of a speaker's voice corresponding to a first utterance, a second feature vector corresponding to characteristics of a speaker's voice corresponding to a second utterance, and a label indicating if the feature vectors are for the same speaker or different speakers. For example, the feature vectors may be labeled as for the same speaker if the first and second utterances are from the same speaker. In another example, the feature vectors may be labeled as for different speakers if the first and second utterances are from different speakers.

The computing system 120 uses the labeled pairs of feature vectors 126 to train a second neural network 141, resulting in a second trained neural network 143. In some implementations, the second neural network 141 is a supervised deep neural network. During training, the labeled pairs of feature vectors 126 are provided as input to the second neural network 141. One or more parameters of the second neural network 141 are adjusted during training to form a second trained neural network 143. The one or more parameters of the second neural network 141 may be adjusted similarly to how the one or more parameters of the neural network 140 may be adjusted during training, as described above. The training phase of the second neural network 141 is described in more detail below in descriptions of FIG. 8.

During stage (D), once the neural network 140 and the second neural network 141 have been trained, a speaker verification model 144 based on the trained neural network 142 is transmitted from the computing system 120 to the client device 110 through the network 130. In some implementations, the speaker verification model 144 may omit one or more layers of the neural network 142, so that the speaker verification model 144 includes only a portion of, or subset of, the trained neural network 142. For example, the speaker verification model 144 may include the input layer and the hidden layers of the trained neural network 142, and use the last hidden layer of the trained neural network 142 as the output layer of the speaker verification model 144. As another example, the speaker verification model 144 may include the input layer of the trained neural network 142, and the hidden layers that sequentially follow the input layer, up to a particular hidden layer that has been characterized to have a computation complexity exceeding a threshold.

During stage (E), a user 102 who desires to enroll her voice with the client device 110 provides one or more enrollment utterances 152 to the client device 110 in the enrollment phase. In general, the user 102 is not one of the training speakers that generated the set of training utterances 122. In some implementations, the user client device 110 may prompt the user 102 to speak an enrollment phrase that is the same phrase spoken by the set of training speakers. In some implementations, the client device 110 may prompt the user to speak the enrollment phrase several times, and record the spoken enrollment utterances as the enrollment utterances 152.

The client device 110 uses the enrollment utterances 152 to enroll the user 102 in a speaker verification system of the client device 110. In general, the enrollment of the user 102 is done without retraining the speaker verification model 144 or any other neural network. The same speaker verification model 144 may be used at many different client devices, and for enrolling many different speakers, without requiring changing the weight values of other parameters in a neural network. Because the speaker verification model 144 can be used to enroll any user without retraining a neural network, enrollment may be done at the client device 110 with limited processing requirements. In some implementations, information about the enrollment utterances 152 is input to the speaker verification model 144, and the speaker verification model 144 may output a reference vector corresponding to the user 102. The output of the speaker verification model 144 may represent characteristics of the user's voice. The client device 100 stores this reference vector for later use in verifying the voice of the user 102. The enrollment phase of a neural network is described in more details below in descriptions of FIGS. 4 and 5.

During stage (F), the user 102 attempts to gain access to the client device 110 using voice authentication. The user 102 provides a verification utterance 154 to the client device 110 in the verification phase. In some implementations, the verification utterance 154 is an utterance of the same phrase that was spoken as the enrollment utterance 152. The verification utterance 154 is used as input to the speaker verification model 144.

During stage (G), the client device 110 determines whether the user's voice is a match to the voice of the enrolled user. In some implementation, the speaker verification model 144 may output an evaluation vector that corresponds to the verification utterance 154. In some implementations, the client device 110 may compare the evaluation vector with the reference vector of the user 102 using the evaluation vector similarity model 144 to determine whether the verification utterance 154 was spoken by the user 102. In some implementations, the client device 110 may input the evaluation vector and the reference vector of the user 120 into an evaluation vector similarity model 144 to determine whether the verification utterance 154 was spoken by the user 102. The verification phase of a neural network is described in more details below in FIGS. 6, 7, 8, and 9B.

During stage (H), the client device 110 provides an indication that represents a verification result 156 to the user 102. In some implementations, if the client device 110 has accepted the identity of the user 102, the client device 110 may send the user 102 a visual or audio indication that the verification is successful. In some other implementations, if the client device 110 has accepted the identity of the user 102, the client device 110 may prompt the user 102 for a next input. For example, the client device 110 may output a message "Device enabled. Please enter your search" on the display. In some other implementations, if the client device 110 has accepted the identity of the user 102, the client device 110 may perform a subsequent action without waiting for further inputs from the user 102. For example, the user 102 may speak "Hello Phone, search the nearest coffee shop" to the client device 110 during the verification phase. The client device 110 may verify the identity of the user 102 using the verification phrase "Hello Phone." If the identity of the user 102 is accepted, the client device 110 may perform the search for the nearest coffee shop without asking the user 102 for further inputs.

In some implementations, if the client device 110 has rejected the identity of the user 102, the client device 110 may send the user 102 a visual or audio indication that the verification is rejected. In some implementations, if the client device 110 has rejected the identity of the user 102, the client device 110 may prompt the user 102 for another utterance attempt. In some implementations, if the number of attempts exceeds a threshold, the client device 110 may disallow the user 102 from further attempting to verify her identity.

Figure 2A:
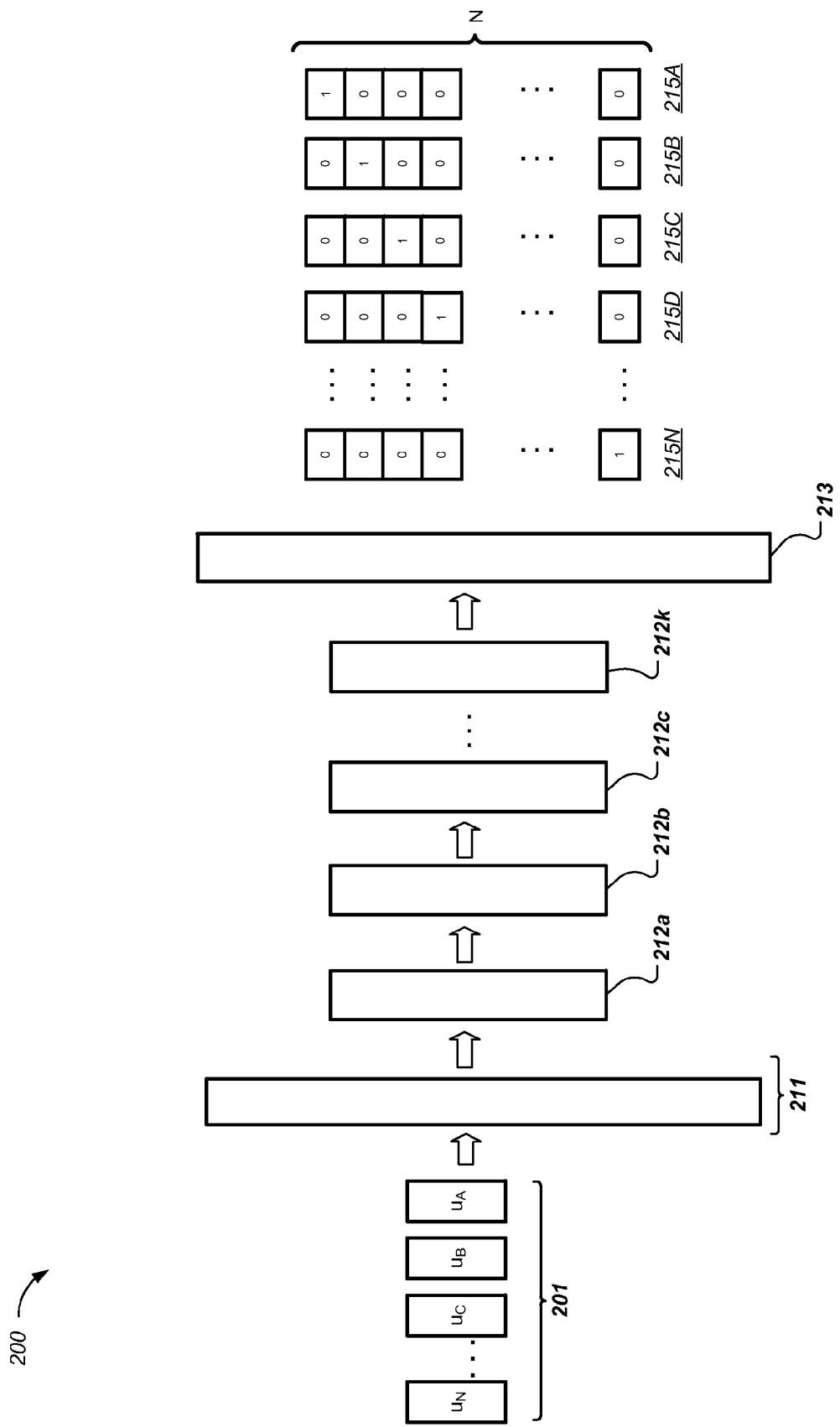
FIG. 2A is a block diagram of an example neural network for training a speaker verification model.

FIG. 2A is a block diagram of an example neural network 200 for training a speaker verification model. The neural network 200 includes an input layer 211, a number of hidden layers 212a-212k, and an output layer 213. The input layer 211 receives data about the training utterances. During training, one or more parameters of one or more hidden layers 212a-212k of the neural network are adjusted to form a trained neural network. For example, one or more hidden layers may be adjusted to obtain different target vectors corresponding to the different training utterances 122 until a desired set of target vectors are formed. In some implementations, the desired set of target vectors may be a set of feature vectors, where each feature vector is orthogonal to other feature vectors in the set. For example, for N training speakers, the neural network 200 may output N vectors, each vector corresponding to the speaker features of the one of the N training speakers.

A set of input vectors 201 for use in training is determined from sample utterances from multiple speakers. In the example, the value N represents the number of training speakers whose speech samples are used for training. The input vectors 201 are represented as $\{u_A, u_B, u_C, \ldots, u_N\}$. The input vector $u_A$ represents characteristics of an utterance of speaker A, the input vector $u_A$ represents characteristics of an utterance of speaker B, and so on. For each of the different training speakers, a corresponding target vector 215A-215N is assigned as a desired output of the neural network in response to input for that speaker. For example, the target vector 215A is assigned to Speaker A. When trained, the neural network should produce the target vector 215A in response to input that describes an utterance of Speaker A. Similarly, the target vector 215B is assigned to Speaker B, the target vector 215C is assigned to Speaker C, and so on.

In some implementations, training utterances may be processed to remove noises associated with the utterances before deriving the input vectors 201 from the utterances. In some implementations, each training speaker may have spoken several utterances of the same training phrase. For example, each training speaker may have been asked to speak the phrase "hello Google" ten times to form the training utterances. An input vector corresponding to each utterance, e.g., each instance of the spoken phrase, may be used during training. As an alternative, characteristics of multiple utterances may be reflected in a single input vector. The set of training utterances 201 are processed sequentially through hidden layers 212a, 212b, 212c, to 212k, and the output layer 213.

In some implementations, the neural network 200 may be trained under machine or human supervision to output N orthogonal vectors. For each input vector 201, the output at the output layer 213 may be compared to the appropriate target vector 215A-215N, and updates to the parameters of the hidden layers 212a-212k are made until the neural network produces the desired target output corresponding to the input at the input layer 211. For example, techniques such as backward propagation of errors, commonly referred to as backpropagation, may be used to train the neural network. Other techniques may additionally or alternatively be used. When training is complete, for example, the output vector 215A may be a 1-by-N vector having a value of [1, 0, 0, . . . , 0], and corresponds to the speech features of utterance $u_A$. Similarly, the output vector 215B is another 1-by-N vector having a value of [0, 1, 0, . . . , 0], and corresponds to the speech features of utterance $u_A$.

The hidden layers 212a-212k can have various different configurations, as described further with respect to FIGS. 2B and 2C below. For example, rectified linear units may be used as the non-linear activation function on hidden units and a learning rate of 0.001 with exponential decay (0.1 every 5M steps). Alternatively, a different learning rate (e.g., 0.1, 0.01, 0.0001, etc.) or a different number of steps (e.g., 0.1M, 1M, 10M, etc.) may be used.

In some implementations, once the neural network 200 is trained, a speech verification model may be obtained based on the neural network 200. In some implementations, the output layer 213 may be excluded from the speech verification model, which may reduce the size of the speech verification model or provide other benefits. For example, a speech verification model trained based on speech of 500 different training speakers may have a size of less than 1 MB.

FIG. 2B is a block diagram of an example neural network 200 having a hidden layer 212a that implements the maxout feature.

In some implementations, the neural network 200 may be trained as a maxout neural network. Maxout networks differ from the standard multi-layer perceptron (MLP) networks in that hidden units, e.g., nodes or neurons, at each layer are divided into non-overlapping groups. Each group may generate a single activation via the max pooling operation. For example, the hidden layer 212a shows four hidden nodes 226a-226d, with a pool size of three. Each of the nodes 221a, 221b, and 221c produces an output, but only the maximum of the three outputs is selected by node 226a to be the input to the next hidden layer. Similarly, each of the nodes 222a, 222b, and 222c produces an output, but only the maximum of the three outputs is selected by node 226b to be the input to the next hidden layer.

Alternatively, a different number of layers (e.g., 2, 3, 5, 8, etc.) or a different number of nodes per layer (e.g., 16, 32, 64, 128, 512, 1024, etc.) may be used. A pool size of 2 is used per layer, but the pool size used may be greater or fewer than this, e.g., 1, 3, 5, 10, etc.

FIG. 2C is a block diagram of an example neural network 200 having a hidden layer 212a that implements a maxout neural network feature using the dropout feature.

In some implementations, the neural network 200 may be trained as a maxout neural network using dropout. In general, dropout is a useful strategy to prevent over-fitting in neural network fine-tuning when using a small training set. In some implementations, the dropout training procedure may include randomly selecting certain hidden nodes of one or more hidden layers, such that output from these hidden nodes are not provided to the next hidden layer.

In some implementations, dropout techniques are used at fewer than all of the hidden layers. For example, the initial hidden layers may not use dropout, but the final layers may use drop out. As another example, the hidden layer 212a shows four hidden nodes 226a-226d, with a pool size of three, and a dropout rate of 50 percent. Each of the nodes 221a, 221b, and 221c produces an output, but only the maximum of the three outputs is selected by node 226a to be the input to the next hidden layer. Similarly, each of the nodes 222a, 222b, and 222c produces an output, but only the maximum of the three outputs is selected by node 226b to be the input to the next hidden layer. However, the hidden layer 212a drops 50 percent of activations as a result of dropout. Here, only the outputs of nodes 226a and 226d are selected as input for the next hidden layer, and the outputs of nodes 226b and 226c are dropped. As an alternative, at layers where dropout is used, the amount of activations dropped may be, for example, 10 percent, 25 percent, 40 percent, 60 percent, 80 percent, etc.

Figure 3:
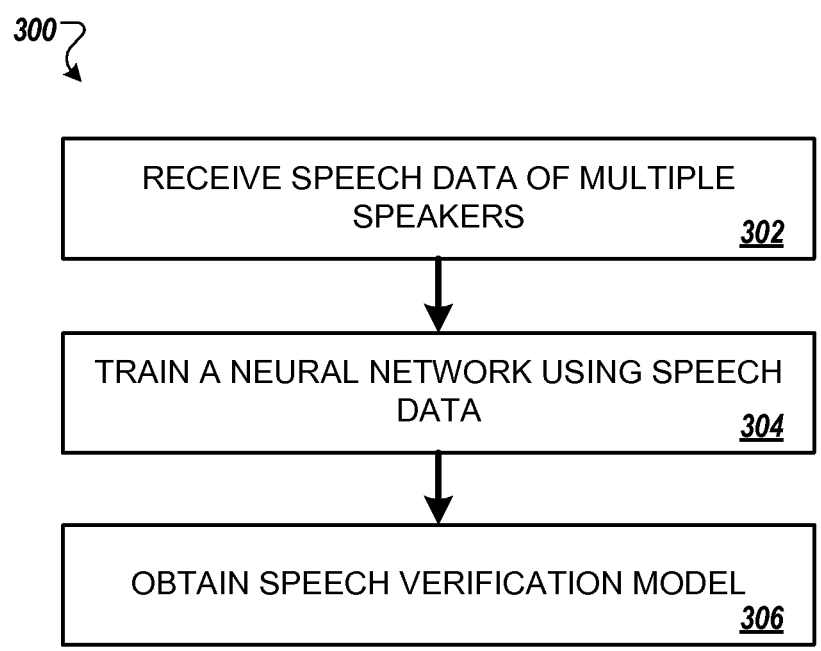
FIG. 3 is a flow chart illustrating an example process for training a speaker verification model.

FIG. 3 is a flow diagram that illustrates an example process 300 for training a speaker verification model. The process 300 may be performed by data processing apparatus, such as the computing system 120 described above or another data processing apparatus.

The system receives speech data corresponding to utterances of multiple different speakers (302). For example, the system may receive a set of training utterances. As another example, the system may receive feature scores that indicate one or more audio characteristics of the training utterances. As another example, using the training utterances, the system may determine feature scores that indicate one or more audio characteristics of the training utterances. In some implementations, the feature scores representing one or more audio characteristics of the training utterances may be used as input to a neural network.

The system trains a neural network using the speech data (304). In some implementations, the speech from each of the multiple different speakers may be designated as corresponding to a different output at an output layer of the neural network. In some implementations, the neural network may include multiple hidden layers.

In some implementations, training a neural network using the speech data may include a maxout feature, where for a particular hidden layer of the multiple hidden layers, the system compares output values generated by a predetermined number of nodes of the particular hidden layer, and outputs a maximum output value of the output values based on comparing the output values.

In some implementations, training a neural network using the speech data may include a dropout feature, where for a particular node of a particular hidden layer of the multiple hidden layers, the system determines whether to output an output value generated by the particular node based on a predetermined probability.

The system obtains a speech verification model based on the trained neural network (306). In some implementations, a number of layers of the speech verification model is less than a number of layers of the trained neural network. As a result, the output of the speech verification model is the outputs from a hidden layer of the trained neural network. For example, the speaker verification model may include the input layer and the hidden layers of the trained neural network, and use the last hidden layer of the trained neural network as the output layer of the speaker verification model. As another example, the speaker verification model may include the input layer of the trained neural network, and the hidden layers that sequentially follow the input layer, up to a particular hidden layer that has been characterized to have a computation complexity exceeding a threshold.

Figure 4:
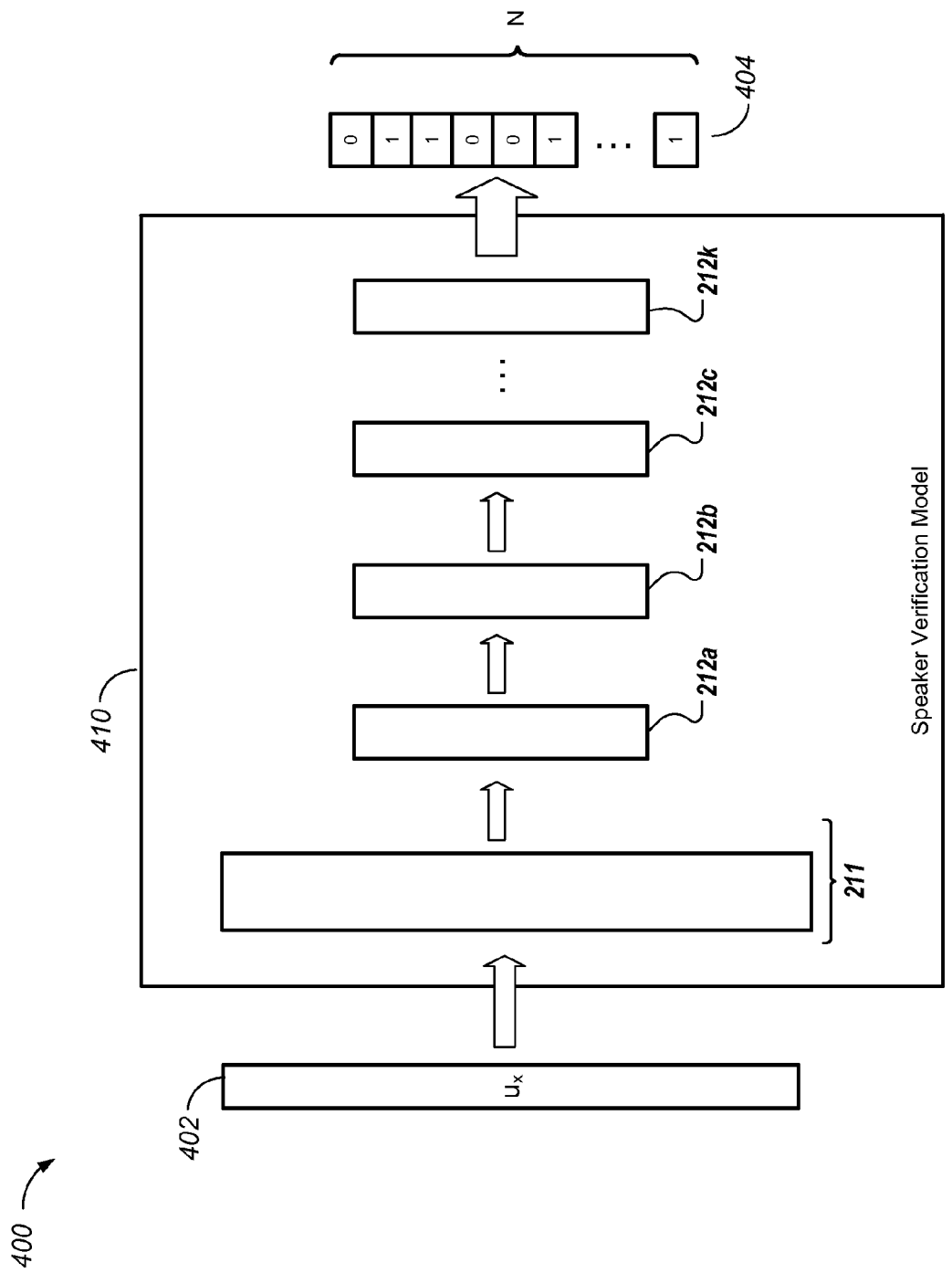
FIG. 4 is a block diagram of an example of using a speaker verification model to enroll a new user.

FIG. 4 is a block diagram of an example speaker verification model 400 for enrolling a new user. In general, the new user is not one of the training speakers that generated the set of training utterances. In some implementations, a user client device storing the speaker verification model 400 may prompt the new user to speak an enrollment phrase that is the same phrase spoken by the set of training speakers. Alternatively, a different phrase may be spoken. In some implementations, the client device may prompt the new user to speak the enrollment phrase several times, and record the spoken enrollment utterances as enrollment utterances. The output of the speaker verification model 400 may be determined for each of the enrollment utterances. The output of the speaker verification model 400 for each enrollment utterance may be accumulated, e.g., averaged or otherwise combined, to serve as a reference vector for the new user.

In general, given a set of utterances $X_s = \{O_{s1}, O_{s2}, \ldots O_{sn}\}$ from a speaker s, with observations $O_{si} = \{o_1, o_2, \ldots, o_m\}$, the process of enrollment may occur as follows. First, every observation $o_j$ in utterance $O_{si}$, together with its context, may be used to feed a speech verification model. In some implementations, the output of the last hidden layer may then be obtained, normalized, and accumulated for all the observations $o_j$ in $O_{si}$. The resulting accumulated vector may be referred to as a reference vector associated with the utterance $O_{si}$. In some implementations, the final representation of the speaker s may be derived by averaging all reference vectors corresponding for utterances in $X_s$.

For example, a speaker verification model 410 is obtained from the neural network 200 as described in FIG. 2A. The speaker verification model 410 includes the input layer 211, and hidden layers 212a-212k of the neural network 200. However, the speaker verification model 410 does not include the output layer 213. When speech features for an enrollment utterance 402 are input to the speaker verification model, the speaker verification model 410 uses the last hidden layer 212k to generate a vector 404.

In some implementations, the vector 404 is used as a reference vector, e.g., a voiceprint or unique identifier that represents characteristics of the user's voice. In some implementations, multiple speech samples are obtained from the user, and a different output vector is obtained from the speaker verification model 410 for each of the multiple speech samples. The various vectors resulting from the different speech samples can be combined, e.g., averaged or otherwise accumulated, to form a reference vector. The reference vector can serve as a template or standard that can be used to identify the user. As discussed further below, outputs from the speaker verification model 410 can be compared with the reference vector to verify the user's identity.

Here, the reference vector 404 is a 1-by-N vector. The reference vector may have the same dimension as any one of the vectors 215A-215N, or may have a different dimension, since the reference vector 404 is obtained from layer 212$k$ and not output layer 213 shown in FIG. 2A. The reference vector 404 has values of [0, 1, 1, 0, 0, 1 . . . , 1], which represent the particular characteristics of the user's voice. Note that the user speaking the enrollment utterance 402 is not included in the set of training speakers, and the speech verification model generates a unique reference vector 404 for the user without retraining the neural network 200.

In general, the completion of an enrollment process causes the reference vector 404 to be stored at the client device in association with a user identity. For example, if the user identity corresponds to an owner or authorized user of the client device that stores the speaker verification model 400, the reference vector 404 can be designated to represent characteristics of an authorized user's voice. In some other implementations, the speaker verification model 400 may store the reference vector 404 at a server, a centralized database, or other device.

Figure 5:
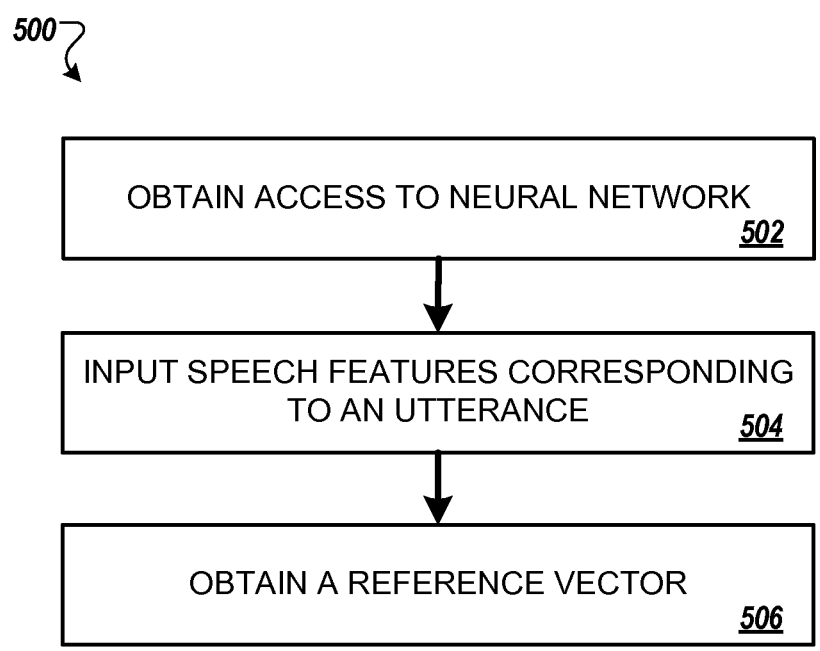
FIG. 5 is a flow chart illustrating an example process for enrolling a new speaker.

FIG. 5 is a flow diagram that illustrates an example process 500 for enrolling a new speaker using the speaker verification model. The process 500 may be performed by data processing apparatus, such as the client device 110 described above or another data processing apparatus.

The system obtains access to a neural network (502). In some implementations, the system may obtain access to a neural network that has been trained to provide an orthogonal vector for each of the training utterances. For example, a speaker verification model may be, or may be derived from, a neural network that has been trained to provide a distinct 1×N feature vector for each speaker in a set of N training speakers. The feature vectors for the different training speakers may be orthogonal to each other. A client device may obtain access to the speaker verification model by communicating with a server system that trained the speaker verification model. In some implementations, the client device may store the speaker verification model locally for enrollment and verification processes.

The system inputs speech features corresponding to an utterance (504). In some implementations, for each of multiple utterances of a particular speaker, the system may input speech data corresponding to the respective utterance to the neural network. For example, the system may prompt a user to speak multiple utterances. For each utterance, feature scores that indicate one or more audio characteristics of the utterance may be determined. The one or more audio characteristics of the training utterances may then be used as input to the neural network.

The system then obtains a reference vector (506). In some implementations, for each of multiple utterances of the particular speaker, the system determines a vector for the respective utterance based on output of a hidden layer of the neural network, and the system combines the vectors for the respective utterances to obtain a reference vector of the particular speaker. In some implementations, the reference vector is an average of the vectors for the respective utterances.

Figure 6:
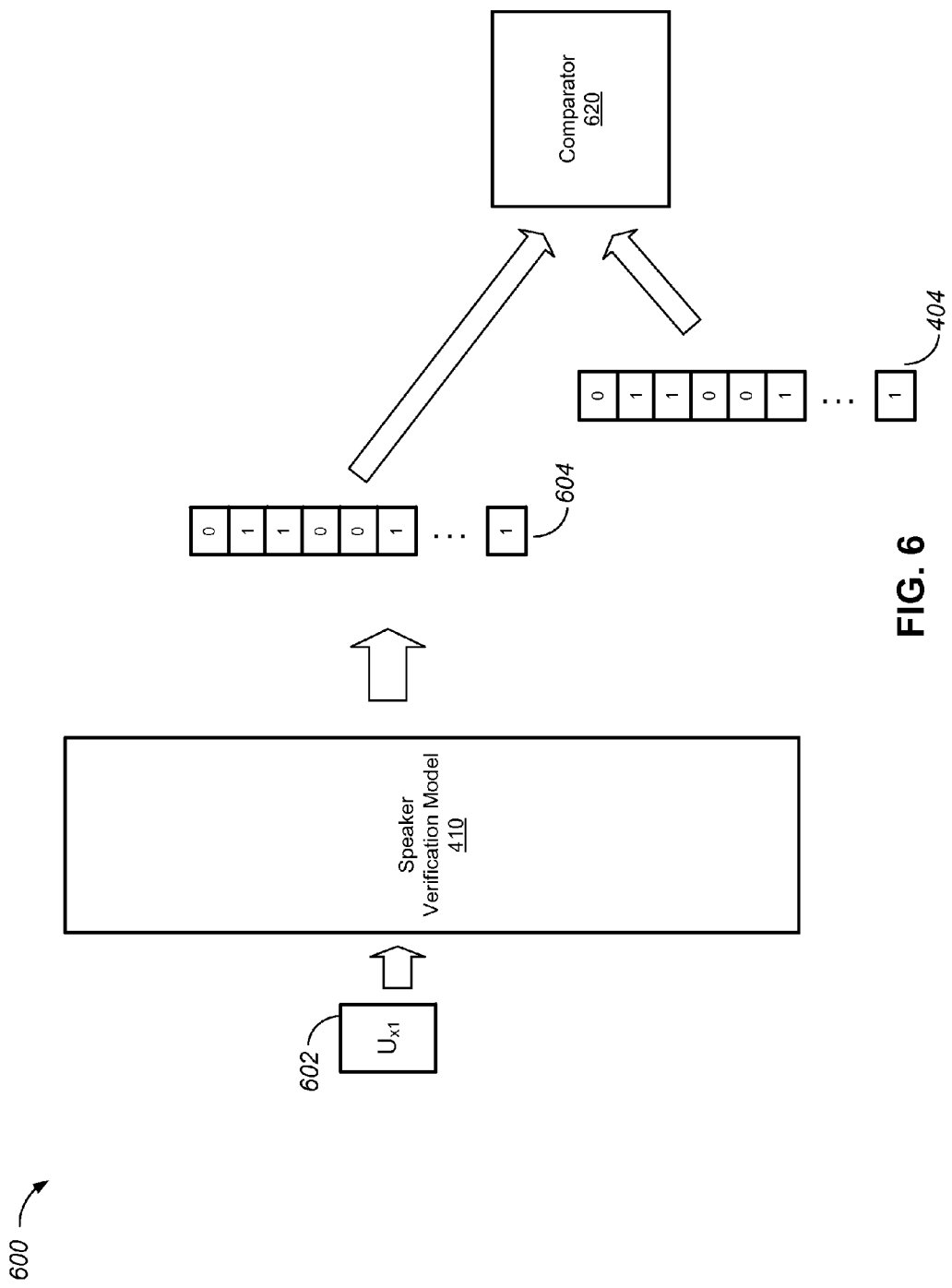
FIG. 6 is a block diagram of an example speaker verification model for verifying the identity of an enrolled user.

FIG. 6 is a block diagram of an example speaker verification model 600 for verifying the identity of an enrolled user. As discussed above, a neural network-based speaker verification method may be used for a small footprint text-dependent speaker verification task. As refers to in this Specification, a text-dependent speaker verification task refers to a computation task where a user speaks specific words or phrase that is predetermined. In other words, the input used for verification may be a predetermined word or phrase expected by the speaker verification model. The speaker verification model 600 may be based on a neural network trained to classify training speakers with distinctive feature vectors. The trained neural network may be used to extract one or more speaker-specific feature vectors from one or more utterances. The speaker-specific feature vectors may be used for speaker verification, for example, to verify the identity of a previously enrolled speaker.

For example, the enrolled user may verify her identity by speaking the verification utterance 602 to a client device. In some implementations, the client device may prompt the user to speak the verification utterance 602 using predetermined text. The client device may record the verification utterance 602. The client device may determine one or more feature scores that indicate one or more audio characteristics of the verification utterances 602. The client device may input the one or more feature scores in the speaker verification model 410. The speaker verification model 410 generates an evaluation vector 604. A comparator 620 compares the evaluation vector 604 to the reference vector 404 to verify the identity of the user. In some implementations, the comparator 620 may generate a score indicating a likelihood that an utterance corresponds to an identity, and the identity may be accepted if the score satisfies a threshold. If the score does not satisfy the threshold, the identity may be rejected.

In some implementations, a cosine distance between the reference vector 404 and the evaluation vector 604 may then be computed. A verification decision may be made by comparing the distance to a threshold. In some implementations, the comparator 620 may be implemented on the client device 110. In some other implementations, the comparator 620 may be implemented on the computing system 120. In some other implementations, the comparator 620 may be implemented on another computing device or computing devices.

In some implementations, the client device may store multiple reference vectors, with each reference vector corresponding to a respective user. Each reference vector is a distinct vector generated by the speaker verification model. In some implementations, the comparator 620 may compare the evaluation vector 604 with multiple reference vectors stored at the client device. The client device may determine an identity of the speaker based on the output of the comparator 620. For example, the client device may determine that the enrolled user corresponding to a reference vector that provides the shortest cosine distance to the evaluation vector 604 to be the identity of the speaker, if the shortest cosine distance satisfies a threshold value.

In some implementations, a neural network-based technique and a vector-based technique can be used together to verify speaker identity. The reference vector system and the vector system can each generate a score indicating a likelihood that an utterance corresponds to an identity. The individual scores can be normalized, and the normalized scores may then be summed or otherwise combined to produce a combined score. A decision about the identity can then be made based on comparing the combined score to a threshold. In some instances, the combined use of a vector approach and a reference-vector approach may outperform either approach used individually.

In some implementations, a client device stores a different reference vector for each of multiple user identities. The client device may store data indicating which reference vector corresponds to each user identity. When a user attempts to access the client device, output of the speaker verification model may be compared with the reference vector corresponding to the user identity claimed by the speaker. In some implementations, the output of the speaker verification model may be compared with reference vectors of multiple different users, to identify which user identity is most likely to correspond to the speaker or to determine if any of the user identities correspond to the speaker.

Figure 7:
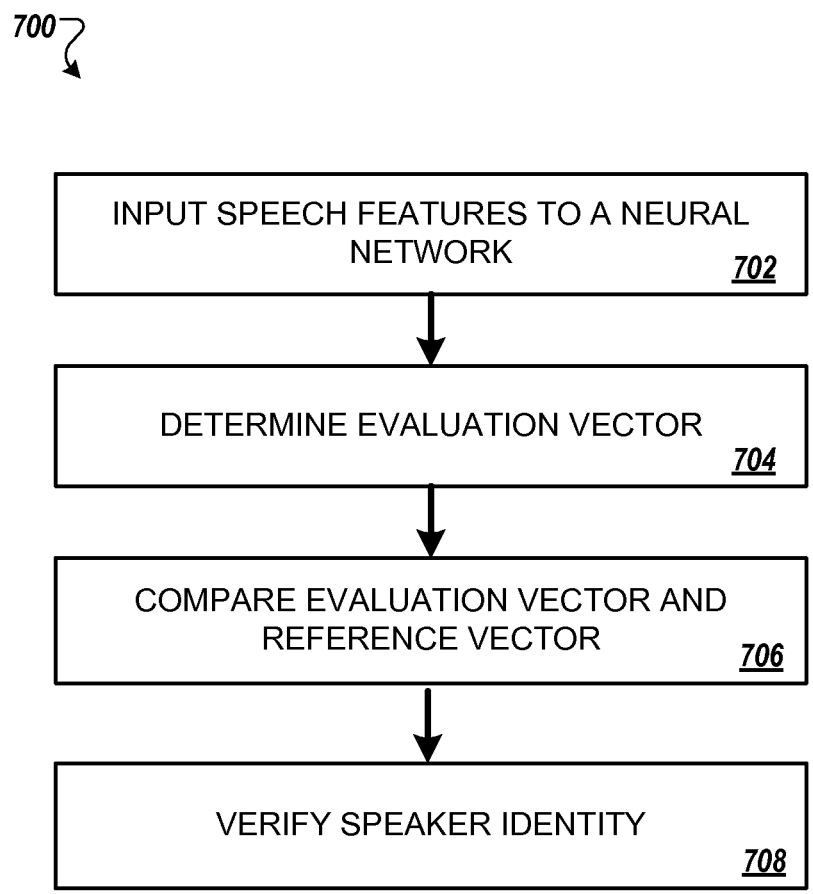
FIG. 7 is a flow chart illustrating an example process for verifying the identity of an enrolled user using a speaker verification model.

FIG. 7 is a flow diagram that illustrates an example process 700 for verifying the identity of an enrolled user using the speaker verification model. The process 700 may be performed by data processing apparatus, such as the client device 110 described above or another data processing apparatus.

The system inputs speech data that correspond to a particular utterance to a neural network (702). In some implementations, the neural network includes multiple hidden layers that are trained using utterances of multiple speakers, where the multiple speakers do not include the particular speaker.

The system determines an evaluation vector based on output at a hidden layer of the neural network (704). In some implementations, the system determines an evaluation vector based on output at a last hidden layer of a trained neural network. In some other implementations, the system determines an evaluation vector based on output at a hidden layer of a trained neural network that optimizes the computation efficiency of a speaker verification model.

The system compares the evaluation vector with a reference vector that corresponds to a past utterance of a particular speaker (706). In some implementations, the system compares the evaluation vector with the reference vector by determining a distance between the evaluation vector and the reference vector. For example, determining a distance between the evaluation vector and the reference vector may include computing a cosine distance between the evaluation vector and the reference vector. In some implementations, the system inputs the evaluation vector and the reference vector into an evaluation vector similarity model, as further described below in FIG. 8.

The system verifies the identity of the particular speaker (708). In some implementations, based on comparing the evaluation vector and the reference vector, the system determines whether the particular utterance was spoken by the particular speaker. In some implementations, the system determines whether the particular utterance was spoken by the particular speaker by determining whether the distance between the evaluation vector and the reference vector satisfies a threshold. In some implementations, the system determines an evaluation vector based on output at a hidden layer of the neural network by determining the evaluation vector based on activations at a last hidden layer of the neural network in response to inputting the speech data.

In some implementations, the neural network includes multiple hidden layers, and the system determines an evaluation vector based on output at a hidden layer of the neural network by determining the evaluation vector based on activations at a predetermined hidden layer of the multiple hidden layers in response to inputting the speech features.

Figure 8:
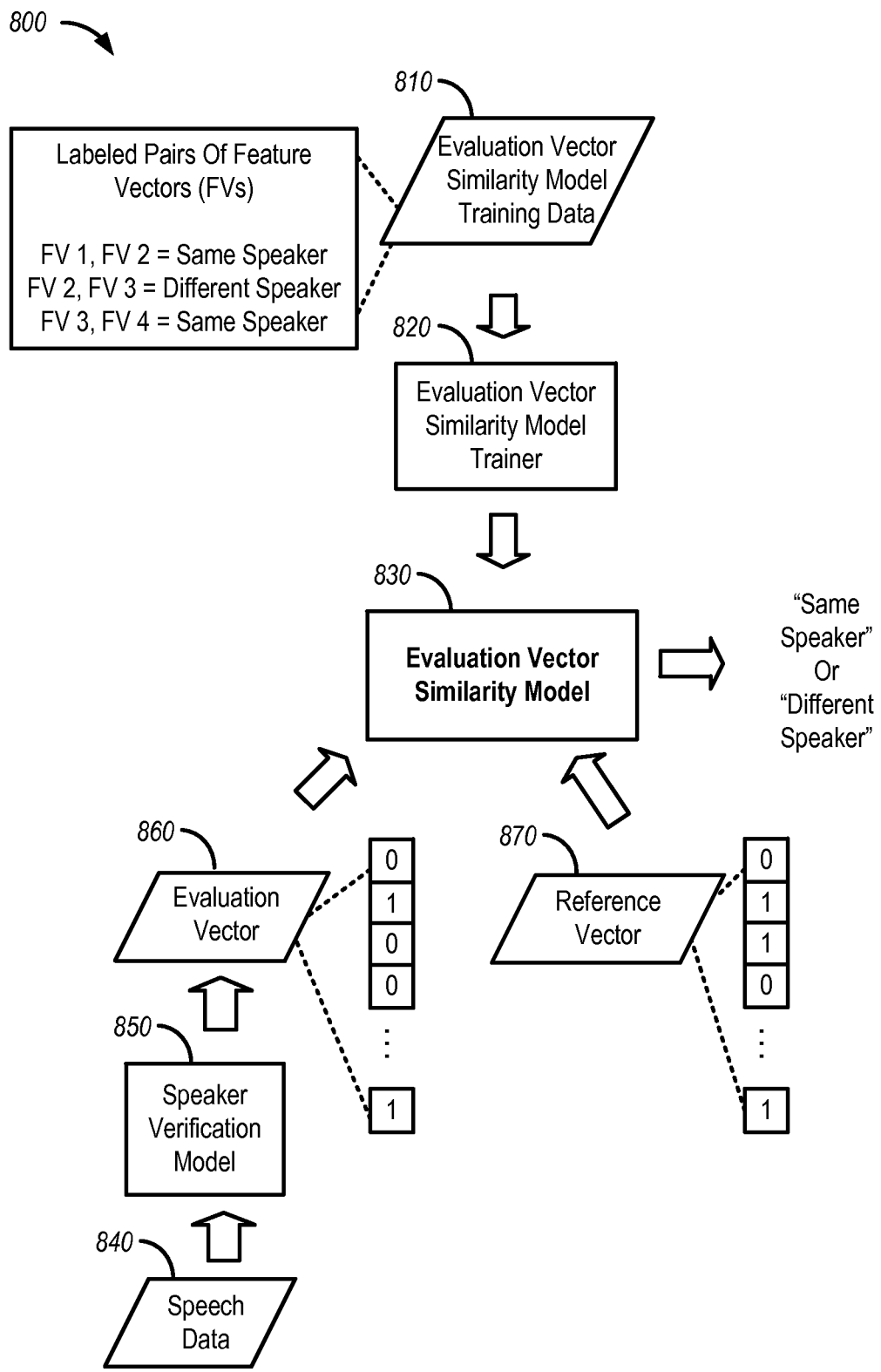
FIG. 8 is a block diagram of an example of speaker verification using an evaluation vector similarity model.

FIG. 8 is a block diagram of an example 800 of speaker verification using an evaluation vector similarity model 830. Initially, evaluation vector similarity model training data 810 may be obtained. The evaluation vector similarity model training data 810 may be labeled pairs of feature vectors that represent characteristics of voices of multiple different speakers. Each labeled pair of feature vectors may include a first feature vector corresponding to characteristics of a speaker's voice corresponding to a first utterance, a second feature vector corresponding to characteristics of a speaker's voice corresponding to a second utterance, and a label indicating if the feature vectors are for the same speaker or different speakers.

For example, the labeled pairs of feature vectors may include a first pair of feature vectors (FV 1, FV 2) labeled as for the same speaker and including a first and second feature vector that are respective outputs from the speaker verification model 850 in response to input of speech data representing an utterance from a first speaker and speech data representing another utterance from the same speaker. The labeled pairs of feature vectors may include a second pair of feature vectors (FV 2, FV 3) labeled as for different speakers and including a second and third feature vector that are respective outputs from the speaker verification model 850 in response to input of speech data representing an utterance from the first speaker and speech data representing another utterance from a second speaker. The labeled pairs of feature vectors may include a third pair of feature vectors (FV 3, FV 4) labeled as for the same speaker and including a third and fourth feature vector that are respective outputs from the speaker verification model 850 in response to input of speech data representing an utterance from the second speaker and speech data representing another utterance from the same speaker.

The labeled pairs of feature vectors may be obtained by providing existing speech data of utterances labeled by speaker as inputs to the speaker verification model 850 and pairing the feature vectors output from the speaker verification model 850 by the labeled speakers. For example, pairs of feature vectors that are output based on speech data labeled as from the same speaker may be labeled as for the same speaker, and pairs of features vectors that are output based on speech data labeled as from different speakers may be labeled as for different speakers. In some implementations, the labels may be associated with similarity scores. For example, a label that indicates that a pair of feature vectors is for the same speaker may be associated with a similarity score of "1.0" and a label that indicates that a pair of feature vectors is for different speakers may be associated with a similarity score of "0.0."

In some implementations, there may be more utterances spoken by different speakers than utterances spoken by the same speaker. For example, if there are ten speakers and each speaker has two utterances, for each speaker, there may be only a single pair of utterances spoken by the speaker but eighteen pairs of utterances spoken by different speakers. Training an evaluation vector similarity model with fewer pairs of feature vectors that are labeled as for the same speaker may reduce the accuracy of the evaluation vector similarity model. Accordingly, additional pairs of feature vectors that are labeled as for the same speaker may be generated.

An additional pair of feature vectors labeled as from the same speaker may be generated for each pair of feature vectors that is labeled as for different speakers. For example, if there are eighteen pairs of feature vectors labeled as for different speakers, eighteen pairs of additional feature vectors labeled as for the same speaker may be generated. The additional labeled feature vectors may be generated by adding random noise, e.g., 1%, 3%, or 5%, to a first feature vector to generate a second feature vector. The amount of random noise added may also be randomly selected between a predetermined range, e.g., 0-5%, 1-8%, or 2-5%. The first feature vector and second feature vector may then be paired and labeled as for the same speaker.

The evaluation vector similarity model training data 810 may be provided to an evaluation vector similarity model trainer 820. The evaluation vector similarity model trainer 820 may use the evaluation vector similarity model training data 810 to train a neural network. In some implementations, training a neural network using the evaluation vector similarity model training data 810 may include a maxout feature or a dropout feature. For example, a feed forward neural network may be trained using rectified linear activation functions using dropout features.

The evaluation vector similarity model trainer 820 may train the neural network so that when a first feature vector and a second feature vector of a labeled pair of feature vectors is received as an input to the neural network, the neural network outputs a result that matches the label for the labeled pair of feature vectors. For example, the evaluation vector similarity model trainer 820 may train a neural network so that when FV 1 and FV 2 are received as inputs, the neural network outputs "SAME SPEAKER," and when FV 2 and FV 3 are received as inputs, the neural network outputs "DIFFERENT SPEAKER." The trained neural network may be the evaluation vector similarity model 830.

During speaker verification, speech data 840 of an utterance from a speaker to be verified as a particular speaker may be obtained and received by the speaker verification model 850. In response to receiving the speech data 840, the speaker verification model 850 may output an evaluation vector 860. For example, the speaker verification model 410 trained as described in FIG. 3 may receive speech data for an utterance 602 and output the evaluation vector 604 as described in FIG. 6.

The evaluation vector similarity model 830 may receive the evaluation vector 860 output by the speaker verification model 850 and obtain a reference vector 870 corresponding to the particular speaker. For example, the evaluation vector similarity model 830 may receive the reference vector 404 designated to represent characteristics of an authorized user's voice. As described above, the reference vector 870 may be an output of the speaker verification model 850 in response to input of speech data for an enrollment utterance from the particular speaker, or an average of multiple outputs of the speaker verification model 850 in response to inputs of speech data for utterances from the particular speaker.

The evaluation vector similarity model 830 may process the evaluation vector 860 and the reference vector 870 and provide an output that indicates whether the utterance was likely spoken by the particular speaker. For example, the evaluation vector similarity model 830 may output, "SAME SPEAKER" or "DIFFERENT SPEAKER."

In some implementations, the evaluation vector similarity model 830 may output a similarity score that may be compared to a similarity threshold to classify whether the utterance was likely spoken by the particular speaker. For example, in the case where labels of the evaluation vector similarity model training data 810 that indicate that pairs of feature vectors are for the same speaker are associated with a similarity score of "1.0" and labels of the evaluation vector similarity model training data 810 that indicate that pairs of feature vectors are for different speakers are associated with a similarity score of "0.0," the evaluation vector similarity model 830 may output a similarity score that ranges from "0.0" to "1.0," and compare the similarity score to a similarity threshold of "0.7," "0.8," or 0.9," to classify whether the utterance was likely spoken by the particular speaker.

In one particular example, the evaluation vector similarity model 830 may output a similarity score of "0.9," which may then be determined to be greater than a similarity threshold of "0.8," and based on the determination that the similarity score is greater than the similarity threshold, the utterance may be classified as likely spoken by the particular speaker. In another particular example, the evaluation vector similarity model 830 may output a similarity score of "0.6," which may then be determined to be less than a similarity threshold of "0.7," and based on the determination that the similarity score is less than the similarity threshold, the utterance may be classified as likely not spoken by the particular speaker.

Figure 9A:
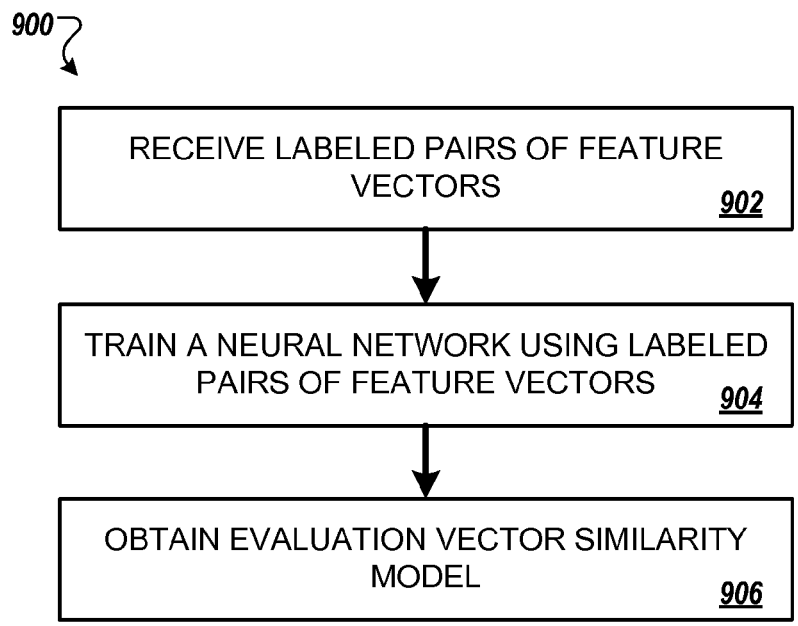
FIG. 9A is a flow chart illustrating an example process for training an evaluation vector similarity model.

FIG. 9A is a flow chart illustrating an example process 900 for training an evaluation vector similarity model. The process 900 may be performed by data processing apparatus, such as the computing system 120 described above or another data processing apparatus.

The computing system 120 may receive labeled pairs of feature vectors (902). For example, the computing system 120 may obtain the evaluation vector similarity model training data 810. As described above, the evaluation vector similarity model training data 810 may include labeled pairs of feature vectors, where each labeled pairs of feature vectors may include a first feature vector, a second feature vector, and a label indicating whether the first feature vector and second feature vector are for the same speaker or different speakers.

The computing system 120 may train a neural network using the labeled pairs of feature vectors (904). For example, the computing system 120 may provide the evaluation vector similarity model training data 810 to the evaluation vector similarity model trainer 820. More details of training the neural network may be found above in relation to the evaluation vector similarity model trainer 820.

The computing system 120 may obtain an evaluation vector similarity model (906). For example, the evaluation vector similarity model 830 may be a neural network trained by the evaluation vector similarity model trainer 820 using the evaluation vector similarity model training data. More details of obtaining the evaluation vector similarity model may be found above in relation to the evaluation vector similarity model trainer 820.

Figure 9B:
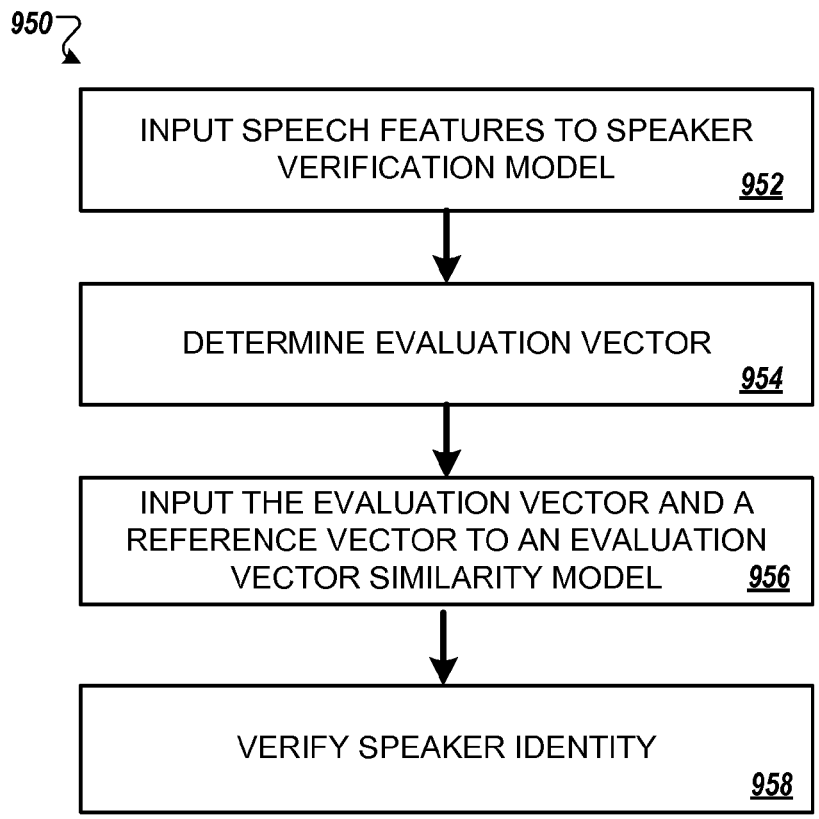
FIG. 9B is a flow chart illustrating an example process for speaker verification using an evaluation vector similarity model.

FIG. 9B is a flow chart illustrating an example process 950 for speaker verification using an evaluation vector similarity model. The process 950 may be performed by data processing apparatus, such as the client device 110 described above or another data processing apparatus.

The client device 110 may input speech data to a speaker verification model (952). For example, the client device 110 may input, to the speaker verification model 850, speech data 840 for an utterance from a speaker to be verified as a particular speaker.

The client device 110 may determine an evaluation vector (954). For example, in response to the speech data 840, the speaker verification model 850 on the client device 110 may output the evaluation vector 860.

The client device 110 may input the evaluation vector and a reference vector to an evaluation vector similarity model (956). For example, the evaluation vector 860 and the reference vector 870 may be provided to the evaluation vector similarity model 830 on the client device 110 for the evaluation vector similarity model 830 to output an indication whether the speaker is likely the particular speaker. The evaluation vector similarity model 830 may output, "SAME SPEAKER" or "DIFFERENT SPEAKER," or a similarity score that may be compared to a similarity threshold to classify whether the utterance was likely spoken by the particular speaker. For example, the evaluation vector similarity model 830 may output a similarity score of "0.95."

The client device 110 may verify the speaker identity (958). For example, if the evaluation vector similarity model 830 outputs an indication that the speaker is likely the particular speaker, the client device 110 may verify that the speaker is the particular speaker. In another example, if the evaluation vector similarity model 830 outputs an indication that the speaker is likely not the particular speaker, the client device 110 may verify that the speaker is not the particular speaker. In yet another example, the client device 110 may determine that a similarity score of "0.95" output by the evaluation vector similarity model 830 is greater than a similarity threshold of "0.9," and based on the determination that the similarity score is greater than the similarity threshold, the client device 110 may verify that the speaker is the particular speaker.

In some implementations, the client device 110 may process voice commands based on speaker verification using the evaluation vector similarity model 830. For example, utterances may include a term that is a hotword followed by terms for a voice command. A hotword may indicate to the client device 110 that terms that follow the hotword are terms for a voice command for the client device 110. According, the client device 110 may not process audio input for voice commands until the client device 110 detects a hotword. However, background utterances from other speakers may include a hotword. To avoid having a particular user's client device 110 detect a hotword in a background utterance and then process audio input for voice commands, the client device 110 may verify using the evaluation vector similarity model 830 that any detected hotword was spoken by the particular user and only process audio input for voice commands when the detected hotword is verified as being spoken by the particular user.

In some implementations, the evaluation vector similarity model training data may also include a corresponding pair of output vectors. The evaluation vector similarity model may receive an evaluation vector, a reference vector, an output vector corresponding to input speech features, and a reference output vector. The evaluation vector similarity model may then output a similarity score based on the four vectors.

In some implementations, the system 100 may use mel-frequency cepstrum coefficients (MFCC) for speaker verification. The system 100 may use a speech recognizer to force align audio input based on phonemes. For example, the speech recognizer may force align an audio signal hotword "OK COMPUTER" with the following sequence of phonemes, "O," "K," "COM," PU," "TER." The system 100 may split the audio signal into segments based on the boundaries of the alignments and, for each segment, compute a MFCC frame using the audio signal across the whole width of the segment. The system 100 may compute MFCC coefficients of the frequency spectrum in a range of [100 Hz, 4000 Hz], then discard the first coefficient and keep the first N coefficients, skipping the first coefficient. N may be a number including 6, 8, 12, or some other number. For example, the result of a computation for the audio signal hotword "OK COMPUTER" using an N of 12 is a 12×5 matrix, holding 5 MFCC frames, each frame holding 12 coefficients. The system 100 may then normalize each frame. For example, the system 100 may normalize each MFCC frame by first subtracting its arithmetic mean, and then dividing the obtained frame by its Euclidean distance. The system 100 may then reshape the matrix into a single feature vector of length 60.

Alternatively to splitting the audio signal hotword based on phonemes, the system 100 may split the audio signal hotword into a predetermined number, e.g., 4, 6, 10, or some other number, of equally long, possibly overlapping, parts. Additionally, instead of using MFCC features, the system 100 may generate feature vectors based on mel-frequency filterbank coefficients.

The system 100 may generate a single composite feature vector from pairs of feature vectors from the same or different speakers. The system 100 may generate the single composite feature vector by comparing a pair of feature vectors using a partial distance. The composite feature vector may be computed based on determining distances of the pair of feature vectors' pairwise scalar components. Different distance functions may be used for comparing corresponding scalar components. For example, a scalar distance may be used or a squared scalar distance used. Alternatively, instead of using a distance function, a similarity function may be used to generate the single composite feature vector. For example, a cosine similarity function may be used. The system 100 may train a classifier using training data including single composite feature vectors that are labeled as either from a pair of feature vectors from the same speaker or from a pair of feature vectors from different speakers.

To verify a user's identity as an enrolled user, the system 100 may obtain a feature vector for the user, a feature vector for the enrolled user, generate a single composite feature vector using the distance or similarity function, and then use the trained classifier to classify the single composite feature vector as generated from a pair of feature vectors from the same speaker, thus verifying the user's identity as the enrolled user, or from different speakers.

A number of implementations have been described. Nevertheless, it will be understood that various modifications may be made without departing from the spirit and scope of the disclosure. For example, various forms of the flows shown above may be used, with steps re-ordered, added, or removed.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer-readable medium for execution by, or to control the operation of, data processing apparatus. The computer readable-medium may be a machine-readable storage device, a machine-readable storage substrate, a memory device, a composition of matter affecting a machine-readable propagated signal, or a combination of one or more of them. The computer-readable medium may be a non-transitory computer-readable medium. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the techniques disclosed, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Thus, particular embodiments have been described. Other embodiments are within the scope of the following claims. For example, the actions recited in the claims may be performed in a different order and still achieve desirable results.

What is claimed is:
1. A computer-method comprising:
inputting speech data that corresponds to a particular utterance to a first neural network;
determining an evaluation vector based on output at a hidden layer of the first neural network;
obtaining a reference vector that corresponds to a past utterance of a particular speaker;
inputting the evaluation vector and the reference vector to a second neural network that is trained on a set of labeled pairs of feature vectors to identify whether speakers associated with the labeled pairs of feature vectors are the same speaker; and determining, based on an output of the second neural network, whether the particular utterance was likely spoken by the particular speaker.

2. The method of claim 1, wherein speakers associated with one or more of the labeled pairs of feature vectors are different speakers.

3. The method of claim 1, wherein a speaker associated with one or more of the labeled pairs of feature vectors is the particular speaker.

4. The method of claim 1, comprising:
inputting the set of labeled pairs of feature vectors to a neural network trainer; and
obtaining the second neural network based on an output of the neural network trainer.

5. The method of claim 1, wherein each of the labeled pairs of the set of labeled pairs of feature vectors comprises a first feature vector, a second feature vector, and a label indicating whether the second neural network is to output that utterances corresponding to the first feature vector and the second feature vector were likely spoken by a same speaker.

6. The method of claim 1, comprising:
generating the set of labeled pairs of feature vectors.

7. The method of claim 6, wherein generating the set of labeled pairs of feature vectors comprises:
inputting speech data that corresponds to a first utterance spoken by the particular speaker to the first neural network;
in response to inputting the speech data that corresponds to the first utterance spoken by the particular speaker to the first neural network, determining a first feature vector based on output at the hidden layer of the first neural network;
inputting speech data that corresponds to a second utterance spoken by the particular speaker to the first neural network;
in response to inputting the speech data that corresponds to the second utterance spoken by the particular speaker to the first neural network, determining a second feature vector based on output at the hidden layer of the first neural network; and
labeling the first feature vector and the second feature vector with an indication that the second neural network is to output that the utterances corresponding to the first feature vector and the second feature vector were likely spoken by the same speaker.

8. The method of claim 6, wherein generating the set of labeled pairs of feature vectors comprises:
determining that a first feature vector and a second feature vector correspond to utterances that are not spoken by the same speaker;
in response to determining that the first feature vector and the second feature vector correspond to utterances that are not spoken by the same speaker, generating a third feature vector based on adding a predetermined amount of random noise to the first feature vector; and
labeling the first feature vector and the third feature vector with an indication that the second neural network is to output that the utterances corresponding to the first feature vector and the third feature vector were likely spoken by the same speaker.

9. The method of claim 1, wherein the particular utterance corresponds to a hotword.

10. The method of claim 1, wherein determining, based on an output of the second neural network, whether the particular utterance was likely spoken by the particular speaker comprises:

determining a cosine distance between the evaluation vector and the reference vector; and
determining, based on the output of the second neural network and the determined cosine distance, whether the particular utterance was likely spoken by the particular speaker.

11. A system comprising:
one or more computers; and
one or more storage devices storing instructions that are operable, when executed by the one or more computers, to cause the one or more computers to perform operations comprising:
inputting speech data that corresponds to a particular utterance to a first neural network;
determining an evaluation vector based on output at a hidden layer of the first neural network;
obtaining a reference vector that corresponds to a past utterance of a particular speaker;
inputting the evaluation vector and the reference vector to a second neural network that is trained on a set of labeled pairs of feature vectors to identify whether speakers associated with the labeled pairs of feature vectors are the same speaker; and
determining, based on an output of the second neural network, whether the particular utterance was likely spoken by the particular speaker.

12. The system of claim 11, wherein speakers associated with one or more of the labeled pairs of feature vectors are different speakers.

13. The system of claim 11, wherein a speaker associated with one or more of the labeled pairs of feature vectors is the particular speaker.

14. The system of claim 11, the operations comprising:
inputting the set of labeled pairs of feature vectors to a neural network trainer; and
obtaining the second neural network based on an output of the neural network trainer.

15. The system of claim 11, wherein each of the labeled pairs of the set of labeled pairs of feature vectors comprises a first feature vector, a second feature vector, and a label indicating whether the second neural network is to output that utterances corresponding to the first feature vector and the second feature vector were likely spoken by a same speaker.

16. The system of claim 11, the operations comprising:
generating the set of labeled pairs of feature vectors.

17. A non-transitory computer-readable medium storing software comprising instructions executable by one or more computers which, upon such execution, cause the one or more computers to perform operations comprising:
inputting speech data that corresponds to a particular utterance to a first neural network;
determining an evaluation vector based on output at a hidden layer of the first neural network;
obtaining a reference vector that corresponds to a past utterance of a particular speaker;
inputting the evaluation vector and the reference vector to a second neural network that is trained on a set of labeled pairs of feature vectors to identify whether speakers associated with the labeled pairs of feature vectors are the same speaker; and
determining, based on an output of the second neural network, whether the particular utterance was likely spoken by the particular speaker.

18. The medium of claim 17, wherein speakers associated with one or more of the labeled pairs of feature vectors are different speakers.

19. The medium of claim 17, wherein a speaker associated with one or more of the labeled pairs of feature vectors is the particular speaker.

20. The medium of claim 17, the operations comprising:
inputting the set of labeled pairs of feature vectors to a neural network trainer; and
obtaining the second neural network based on an output of the neural network trainer.

\* \* \* \* \*